United States Patent

[11] 3,610,819

[72] Inventor Roger D. Thompson
Lancaster, Pa.

[21] Appl. No. 518,631
[22] Filed Jan. 4, 1966
[45] Patented Oct. 5, 1971
[73] Assignee RCA Corporation
New York, N.Y.

[54] VIDEO RECORDING WITH ALTERNATE PERIOD INVERSION AND LOW-FREQUENCY PREMPHASIS
19 Claims, 5 Drawing Figs.

[52] U.S. Cl. .......... 178/6.6 A, 178/DIG. 3, 179/100.2
[51] Int. Cl. .......... G11b 5/02, H04n 5/78, H04n 7/12
[50] Field of Search .......... 178/6.6 A, DIG. 3; 179/100.2

[56] References Cited

UNITED STATES PATENTS

| | | | |
|---|---|---|---|
| 2,281,891 | 5/1942 | Terry | 178/7.1 |
| 2,734,941 | 2/1956 | Zenel | 178/6.6 |
| 2,820,181 | 1/1958 | Bowman | 317/8 |
| 3,403,231 | 9/1968 | Slaton | 179/100.2 |

*Primary Examiner*—Terrell W. Fears
*Assistant Examiner*—Howard W. Britton
*Attorney*—Eugene M. Whitacre

ABSTRACT: Television signals may be recorded with reduced bandwidth by inverting the polarity of the video signal for alternate line periods to eliminate or reduce DC and low-frequency signals. Low-frequency premphasis is used when recording and a keyed clamp may be used to establish sync tip level for reproduction.

Inventor:
ROGER D. THOMPSON

BY Eugene M. Whitacre
Attorney

Inventor:
ROGER D. THOMPSON

BY Eugene M. Whitacre
Attorney

INVENTOR.
ROGER D. THOMPSON
BY Eugene M. Whitacre
ATTORNEY

Inventor:
ROGER D. THOMPSON
BY Eugene M. Whitacre
Attorney

VIDEO RECORDING WITH ALTERNATE PERIOD INVERSION AND LOW-FREQUENCY PREMPHASIS

This invention relates to signal translating systems and particularly to a system for translating a video signal to substantially reduce the amplitude of its low-frequency signal content.

In a signal translating system, such as that which might be found in a video magnetic recorder, it has heretofore been the practice to frequency modulate the video signal to be recorded. In order to economize and simplify these recording systems, however, attempts have been made to record the video signal directly, thus eliminating the need for frequency modulation and demodulation. A serious difficulty encountered here is that a recording system designed to have good high-frequency response, as is necessary for high-quality recording and reproduction, has limited low-frequency response. To some extent, this deficiency can be corrected by frequency response equalizing circuits in the playback system. This technique is limited by the relatively poor signal to noise ratio of the low-frequency components obtained from the playback circuit. This result can be expected because a typical magnetic recording system reproduces low-frequency signals with a gain characteristic which varies inversely with the square of frequency, while sources of noise in the system, such as playback amplifier noise, have spectrums which are more nearly uniform with frequency.

Signal components having frequencies much lower than the line scanning rate need not be reproduced if a keyed clamping technique is used to set either the sync tips of the blanking portions of the video signal to a prescribed level. By this means, very low frequency components, including DC, are restored. When rapid clamping action is attempted to restore components having frequencies only slightly below the line scanning rate, high-frequency noise occurring during the clamping operation will introduce errors which may be more objectionable in the appearance of the television picture than the high-frequency noise itself. In addition to this practical limitation, clamping cannot eliminate the need for frequency components slightly lower than the line scanning rate because they contribute to the faithful reproduction of waveforms during intervals between the clamping periods. In a typical television system with a 15.75 kc. line rate, signal components as low as 1.5 kc. must be reproduced in correct phase and amplitude to avoid detectable distortion between clamping periods.

Attempts to preemphasize low-frequency components before recording have been unsuccessful because their magnitude in typical signals would be such that they would overload the recording head or otherwise exceed the useful dynamic range of the head and tape characteristic.

It is therefore an object of the present invention to provide an improved system for processing a video signal to reduce the amplitude of its low-frequency signal content.

It is another object of the present invention to provide an improved system for processing video signals for recording on and reproduction from a magnetic medium.

It is another object of the present invention to provide an improved system for direct recording of a video signal.

It is still another object of the invention to provide an improved system of video recording which minimizes the need for AC or DC biasing of the magnetic tape.

According to one embodiment of the present invention, as for example, in the recording and reproduction of a video signal, the video signal to be recorded is sampled at one half the scanning line frequency rate by a switch circuit to provide two output signals which alternate between portions of the applied video signal. One of the output signals is then reversed in polarity and added to the other output signal to produce a single train of signals having a reduced magnitude of low-frequency components which may then be recorded on a magnetic recording medium. In effect, the low-frequency components contained in the video signal are nearly cancelled by the reversed signal polarity of portions of the video signal so as to be effectively absent, or materially reduced in amplitude. This permits preemphasis of low-frequency components prior to recording without overloading the recording head. In playback, the reproduced signal is applied to a phase splitter wherein two oppositely poled signals are obtained. Each of the outputs from said splitter is then used to drive an amplifier which is biased to cut off at sync tips. The amplifiers conduct alternately on portions of the applied signal representative of successive scanning intervals, and their outputs are added in a common output impedance to reconstruct the original video signal.

The novel features which are considered to be characteristic of this invention are set forth with particularity in the appended claims.

The invention itself, both as to its organization and method of operation, as well as other objects and advantages thereof, will become more readily apparent from a reading of the following description in connection with the accompanying drawings in which:

FIG. 1*a* is a block diagram of the video recording system embodying the invention;

FIG. 1*b* is a block diagram of a video reproducing system embodying the invention;

FIG. 1*c* is a block diagram of another reproducing system embodying the invention;

FIG. 4 illustrates schematically a modification of the circuit of FIG. 2 and which may be employed in the system of FIG. 1*a.

The present invention will be explained with reference principally to those parts of a magnetic recording system which involve the processing of a video signal prior to its application to the recording head and subsequent to its retrieval through the playback head. Any description of the structural arrangement of the heads, capstan and drive mechanism associated with magnetic recorders, the details of which are known to those skilled in the art but which have no bearing on the present invention, have been omitted.

Figure 1:
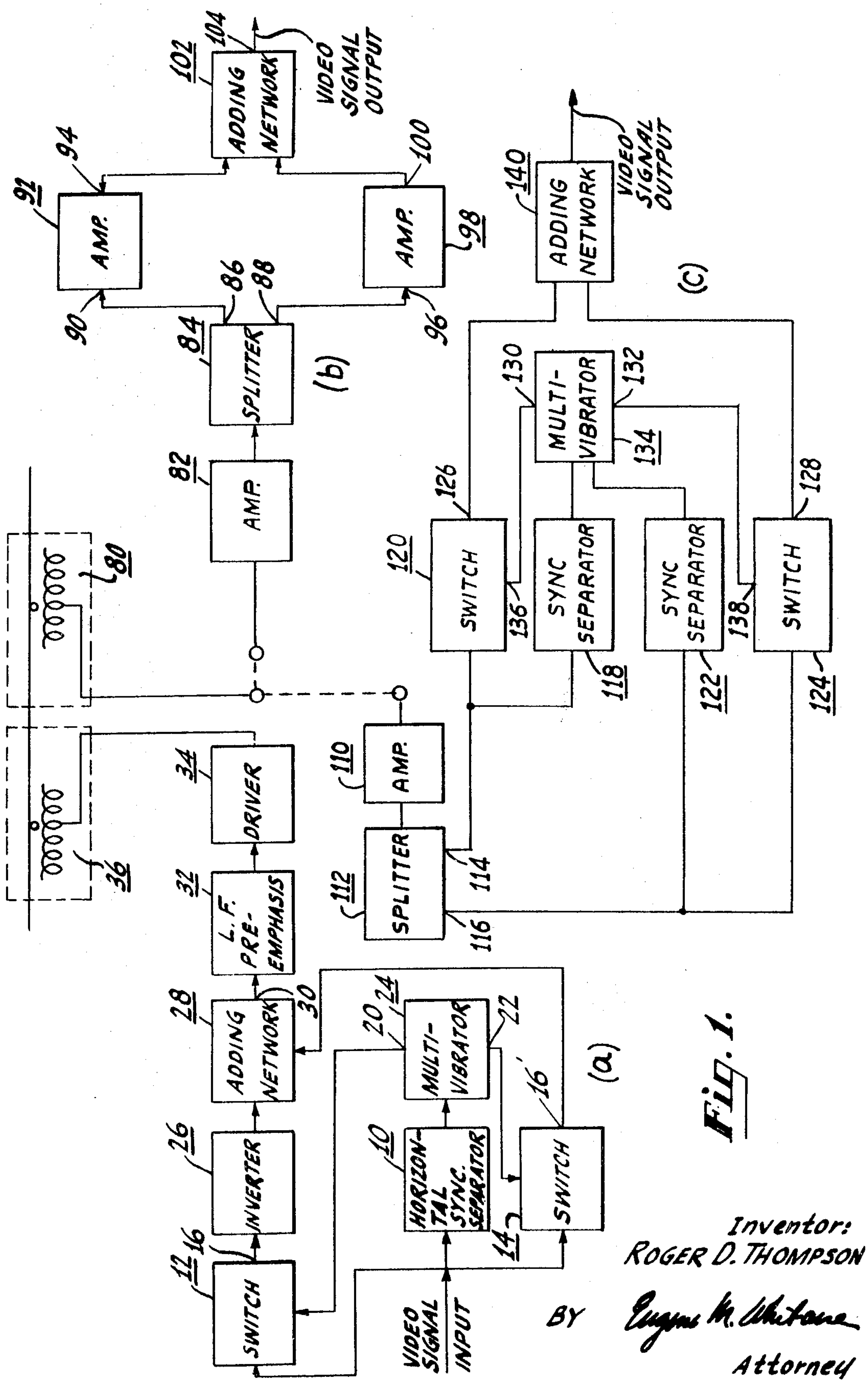

Referring now to FIG. 1*a* wherein a block diagram illustrating one embodiment of the recording portion of the invention is shown, a video signal to be recorded, such as a television signal representative of successive scanning intervals, said signal containing picture information components and recurrent synchronizing information components, with said picture information components also including blanking components, is simultaneously applied to the respective input terminals of a horizontal sync separator 10 and a pair of sampling devices or switches 12 and 14. The output wave from the horizontal sync separator 10 comprises a series of pulses corresponding to the horizontal synchronizing pulses contained in the applied video signal. Switches 12 and 14 are designed to pass or gate alternately selected portions of the applied video signal corresponding to successive scanning intervals to the respective switch output terminals 16 and 16' for further processing as will be hereinafter described.

The gating of switches 12 and 14 is controlled by a series of gating pulses developed at and alternating between the output terminals 20 and 22 of a bistable multivibrator 24. The multivibrator 24 is triggered by the output pulses from the horizontal sync separator 10 and is designed to produce gating pulses commencing and ending at times coincident with the lagging edges of consecutive horizontal sync pulse portions of the video signal and equal to one television line in duration. Application of the gating pulses to the switches 12 and 14 causes portions of the applied video signal corresponding to alternate scanning intervals to appear sequentially at the respective switch output terminals 16 and 16'. The signal at each output terminal substantially comprises one half the applied video signal with the sum of the two output signals being equal to the applied input signal plus the gate signal component.

The output signal from switch 12 is passed through an inverter 26 and then applied to an adding network 28. The inverter effects a polarity reversal of the signal passed through it. The output signal from switch 14 is also applied to the adding network 28 for combination with the polarity inverted signal from switch 12. The combined signal with the polarity of the signal portions corresponding to alternate scanning intervals reversed then appears at the output terminal 30 of the adding network 28.

Figure 2:
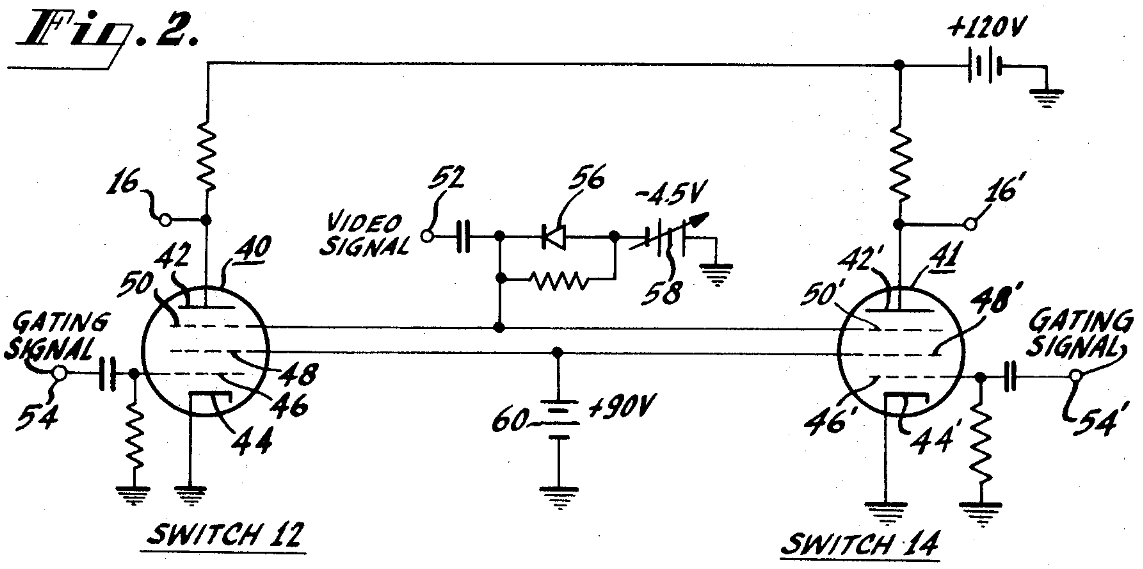
FIG. 2 illustrates schematically a circuit which may be employed in the system of FIG. 1*a;*

Before describing in greater particularity the apparatus of the present invention, it may be noted that FIG. 2 illustrates circuitry suitable for performing the functions of the gated switches 12 and 14 of FIG. 1*a*. By way of example, gated switches 12 and 14 may each include a multielectron tube 40 and 41 such as a 6AS6. The tube 40 has an anode 42, a cathode 44, and first, second and third respectively arranged grid electrodes 46, 48 and 50 and the tube 41 has corresponding electrodes designated by the same reference numeral with a prime. The video signal to be sampled by the switches 12 and 14 is applied to a terminal 52 with sync excursions in the negative direction, for application to the third grid electrodes 50 and 50′ and the gating pulses from the multivibrator 24 are applied to terminals 54 and 54′ for application to the first grid electrodes 46 and 46′. From an inspection of the circuit it will be seen that the currents to plate electrodes 42 and 42′ are respectively dependent upon the potentials applied to both the grid electrodes 46 and 46′ and the grid electrodes 50 and 50′ and that the gating signal will appear in the plate current of each tube, even when there is no video input signal. Sync tips of the input video signal are set by a diode 56 to −4.5 volts. Under these conditions, the control actions of grid electrodes 50 and 50′ are essentially linear. The waveforms appropriate to this circuit in conjunction with the recording portion of the invention just described are shown in FIG. 3.

FIG. 3*a* represents the signal to be recorded and applied to the input terminal 52 of switches 12 and 14. FIGS. 3*b* and 3*c* are representative of the gating signals appearing at the respective multivibrator output terminals 20 and 22 and respectively applied to terminals 54 and 54′ of switches 12 and 14. FIG. 3*d* represents the alternately gated output signal appearing at terminal 16 of switch 12 due to the application of the gating signal shown in FIG. 3*b* on the video signal shown in FIG. 3*a*. The output signal from switch 14 is obtained in a similar way and is shown in FIG. 3*e* after inversion in the polarity inverter 26. FIG. 3*f* represents the combined signal appearing at the output terminal 30 of the adding network 28.

Figure 3:
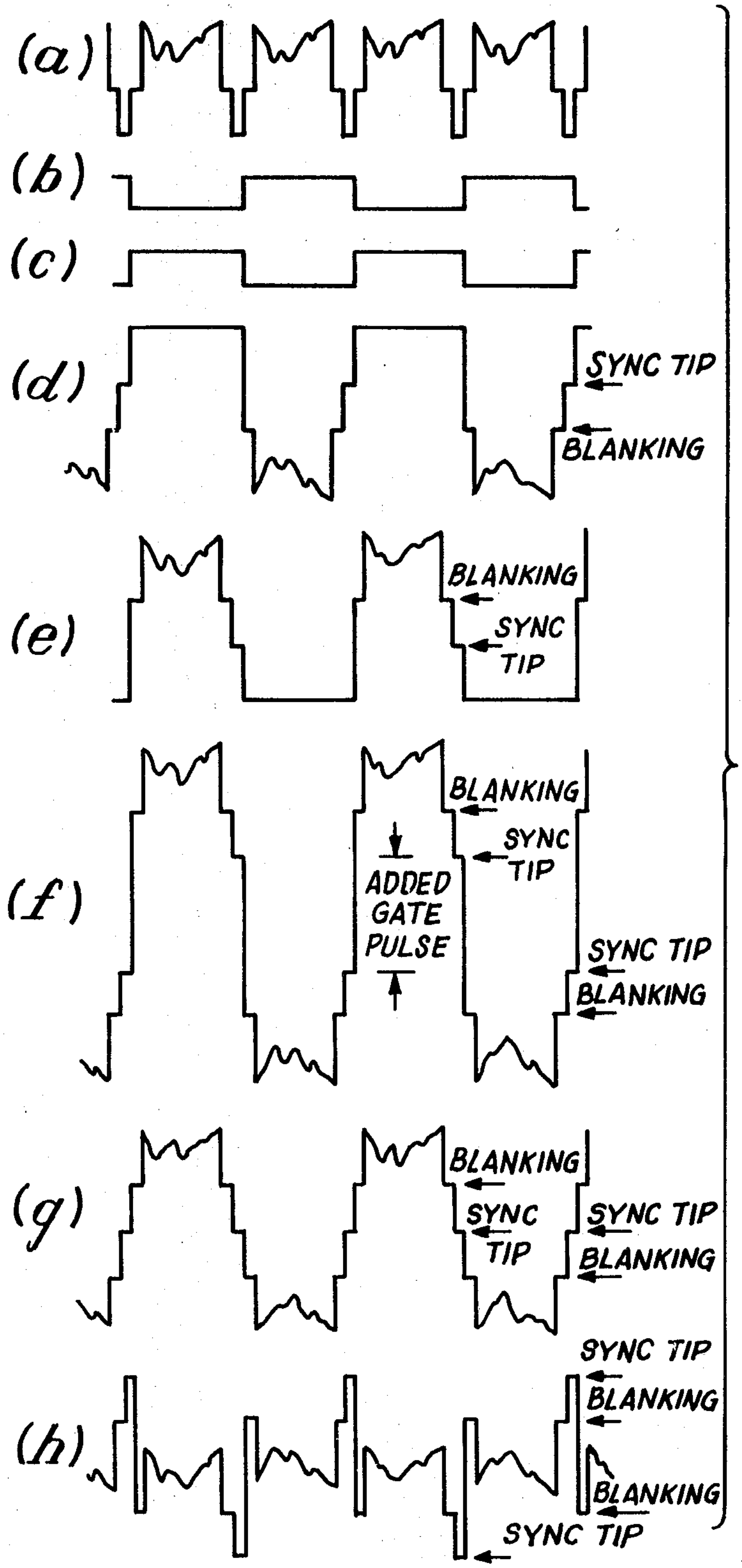
FIG. 3 is a graphical representation of a series of waveforms useful in describing the operation of the recording portion of the system shown in FIG. 1*a;*

It will be noted that FIG. 3 is drawn with the gating signal waveforms coincident with the lagging edge of the sync pulse portions of the video signal. As will be hereinafter disclosed, the timing of the gating pulse is arbitrary and has significance only in the ease with which the horizontal sync pulses can be separated from the reconstructed playback signal.

Because the plate currents of the 6AS6 tubes 40 and 41′ do not go to zero at sync tips with the bias values shown, the waveforms in FIGS. 3 (*d*), (*e*) and (*f*) have large gating signal components. As will be shown, this may be desirable, depending upon the relative extent of nonlinearity of the recording medium. In particular, the magnitude of the added gating pulse in FIG. 3*f* can be set by adjusting the potential of the bias battery 58 in the third grid electrode circuit of tubes 40 and 41. If the bias is increased to the point where the plate current of each 6AS6 tube is cut off at sync tips, the waveform shown in FIG. 3*g* will be produced at the output terminal 30 of the adding network 28. It will be apparent that the waveform of FIG. 3*g* can also be produced by adding in appropriate magnitude the gating signal shown in FIG. 3*b* to the waveform shown in FIG. 3*f*. Thus the waveform of FIG. 3*g* is a special case of the waveform shown in FIG. 3*f*.

Waveform 3*h* illustrates another special case of the waveform shown in 3*f* and is produced by adding a still greater magnitude of the gating signal 3*b* than was used to produce 3*f*. It will be apparent that many modifications of the waveforms shown in FIGS. 3*f*, 3*g* and 3*h* can be produced, depending on the relative magnitudes of the applied video and gating signals as well as the bias values utilized with tubes 40 and 41.

Figure 4:
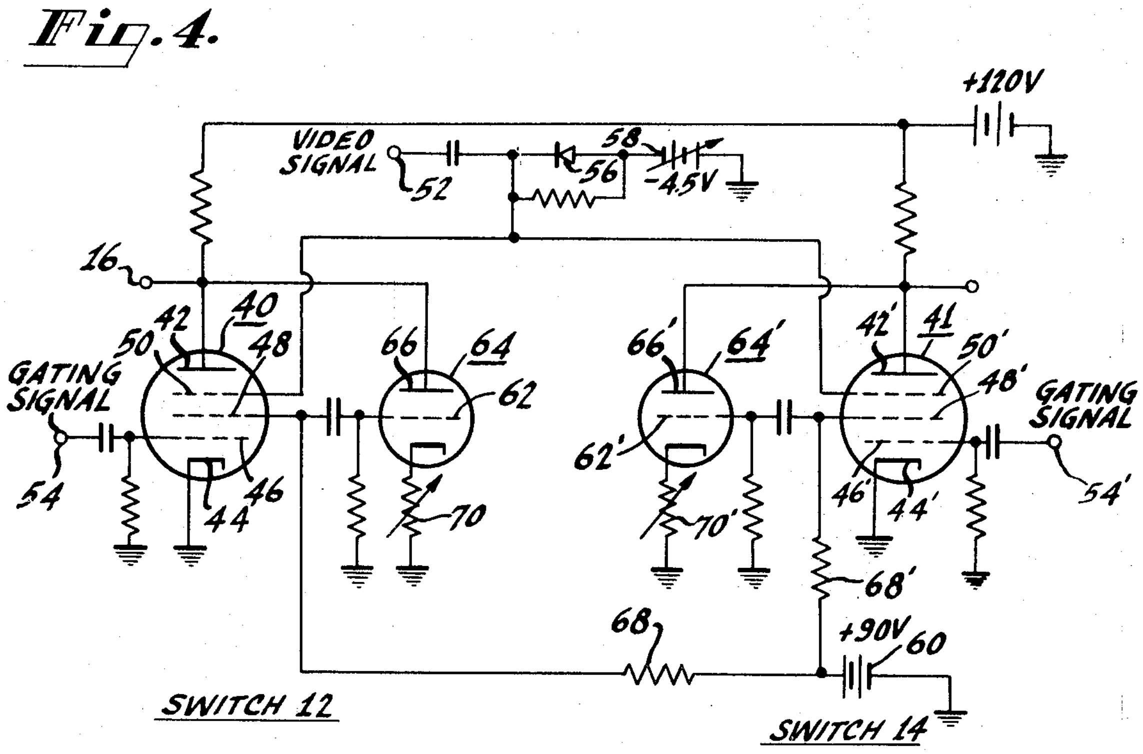

The waveform shown in FIG. 3*g* may also be produced by a modified balanced version of the circuit of FIG. 3 as illustrated in FIG. 4. Here the video signal applied to the third electrode grids 50 and 50′ varies the relative portions of cathode currents which reach the plates 42 and 42′ and the screen or second grid electrodes 48 and 48′ of the tubes 40 and 41. Thus, the current in the screen grids 48 and 48′ attributable to the video signal has a polarity opposite to that in the respective plates 42 and 42′. As shown in FIG. 4, in addition to being returned to a B+ screen supply 60, through resistors 68 and 68′, the screen grids 48 and 48′ are AC coupled to the control grids 62 and 62′ of a pair of triode electron tubes 64 and 64′ operating as an amplifier. The plates 66 and 66′ of the triodes 64 and 64′ are direct coupled to the plates 42 and 42′ of the tubes 40 and 41. The screen current develops a voltage drop across the screen grid resistors 68 and 68′ which is then amplified, inverted, and added as an aiding video signal current to the plate circuits of the tubes 40 and 41. On the other hand, the currents in the screen grids 48 and 48′ and plates 42 and 42′ of each of the tubes 40 and 41 attributable to the respective gating signals are of the same polarity. The portion of this current in the plate circuit of the tubes 40 and 41 is then cancelled out by the inverting action of the triode amplifiers. The gain of each triode amplifier is controlled by means of respective variable feedback resistors 70 and 70′ in the amplifier cathode circuits. By this means the gating pulse signal in the plates 42 and 42′ can be cancelled for a given potential in the third electrode grid circuits of tubes 40 and 41, such as that corresponding to the sync tip level, thus producing an effect similar to having the sync tips at cutoff.

An analysis of of the waveform signal shown in FIGS. 3(*f*), (*g*) and (*h*) will reveal that the DC component of the original video signal is no longer present in the illustrated waveforms, and furthermore that the amplitude of low-frequency components of the waveforms, will be small, except for the special case of repetitive detail occurring during alternately successive scanning intervals.

In FIG. 3, gating of the video signal has been shown to occur coincident in time with the lagging edge of the horizontal sync pulses. As mentioned earlier, the timing of the gating pulses will be determined by considerations of obtaining horizontal sync signals from the playback signal with ease and accuracy. It will be appreciated that gating could be timed to switch during the sync pulse, or coincident with the leading edge of the sync pulse, or on the front porch of the horizontal blanking interval before the leading edge of the sync pulse or on the back porch of the horizontal blanking interval after the lagging edge of sync. It will be noted that switching and inversion could be made to occur at a rate other than that of one half the scanning frequency, as for example, a rate equal to or greater than the scanning frequency and less than the highest video frequency to be recorded and reproduced, without departing from the scope of the invention so as to still effect a material reduction or attenuation of the low-frequency components of the video signal.

Referring again to FIG. 1*a*, the combined video signal output from the adding network 28 is passed through a low-frequency preemphasis network 32 and then applied to a recording head driver 34. The signal then goes to a suitable transducer 36 for recording on a magnetic tape.

It will be noted that because of the polarity reversal of portions of the video signal corresponding to alternate scanning intervals, and the resulting reduction or attenuation of the low-frequency components of the video signal, preemphasis of the low-frequency components of the signal can be achieved without overloading the recording head. Furthermore, the reduction in recorded low frequency components minimizes problems of cross-coupling between adjacent tape tracks.

In addition, the combined video signal represented in FIGS. 3(*f*) and 3(*g*) can be recorded on magnetic tape without AC or DC biasing of either the recording head or tape. As heretofore described, the DC level of the horizontal sync pulse components of the applied video signal can be adjusted so that the portions of the combined video signal corresponding to the horizontal sync pulses fill the nonlinear region of the magnetic tape transfer characteristic. If desired, the sync pulses can be predistorted, for example, by a process known in the art as sync stretching, to compensate for the distortion imparted to the sync pulses due to the nonlinear portion of the transfer characteristic. Since the combined video signal will typically contain a very small or no DC component at all, AC coupling can be used. If desired, to correct for the small DC component that may be present in the combined video signal, sync tips can be clamped to a constant level. In particular, the sync tips of the waveform shown in FIG. 3*g* can be clamped to a level of zero recording coil current. In the case of waveform 3*f*, the DC component can be restored by clamping at either or both of the sync tip levels. The picture information portion of the combined video signal will then be in the linear region of the transfer characteristic and will therefore be recorded with a minimum of distortion.

Referring now to FIG. 1*b*, there is shown a reproducing system embodying the invention and suitable for reproducing the recorded information illustrated by the waveforms shown in FIGS. 3*f* or 3*g*. The recorded information is converted into an electrical signal with alternate polarity portions corresponding to successive scanning intervals, by means of a transducer 80 which is coupled to a video playback amplifier 82. The output of the amplifier 82 is applied to the input of a phase splitter 84. The phase splitter 84 provides a pair of output signals at terminals 86 and 88 respectively and corresponding to the applied input signal, with one of the output signals being equal in magnitude but opposite in polarity to the other output signal.

The output signal from terminal 86 of the phase splitter 84 is applied to the input terminal 90 of an amplifier 92. The amplifier 92 is biased to cut off at a level corresponding to the tip of the horizontal sync pulse portion associated with the desired half cycle portions of the input signal. The amplifier 92 effectively acts as a rectifying device or half wave clipper and thus provides a signal at its output terminal 94 which is derived from the positive going portions of the applied signal. Correspondingly, the output signal from terminal 88 of the phase splitter 84 is applied to the input terminal 96 of an amplifier 98 which is also biased to cut off at horizontal sync tip. Since the signal at terminal 88 of the phase splitter 84 is opposite in polarity to the signal appearing at terminal 86 of the phase splitter 84, the signal at the output terminal 100 of the amplifier 98 will appear alternately with respect to the output signal from the amplifier 92, each signal occurring without interruption for a period equal to one television scanning line.

The signal obtained at the output terminal 94 of the amplifier 92 is then applied to an adding network 102. The output signal from the amplifier 98 is also applied to the adding network 102 for combination with the signal received from the amplifier 92. The reproduced video signal appears at the output terminal 104 of the adding network 102. The reproduced signal may then be inverted so as to have negative going horizontal sync tips in conformance with the original recorded signal.

The reconstructed video signal may then be applied to a television transmitter or local television monitor for viewing.

Figure 5:
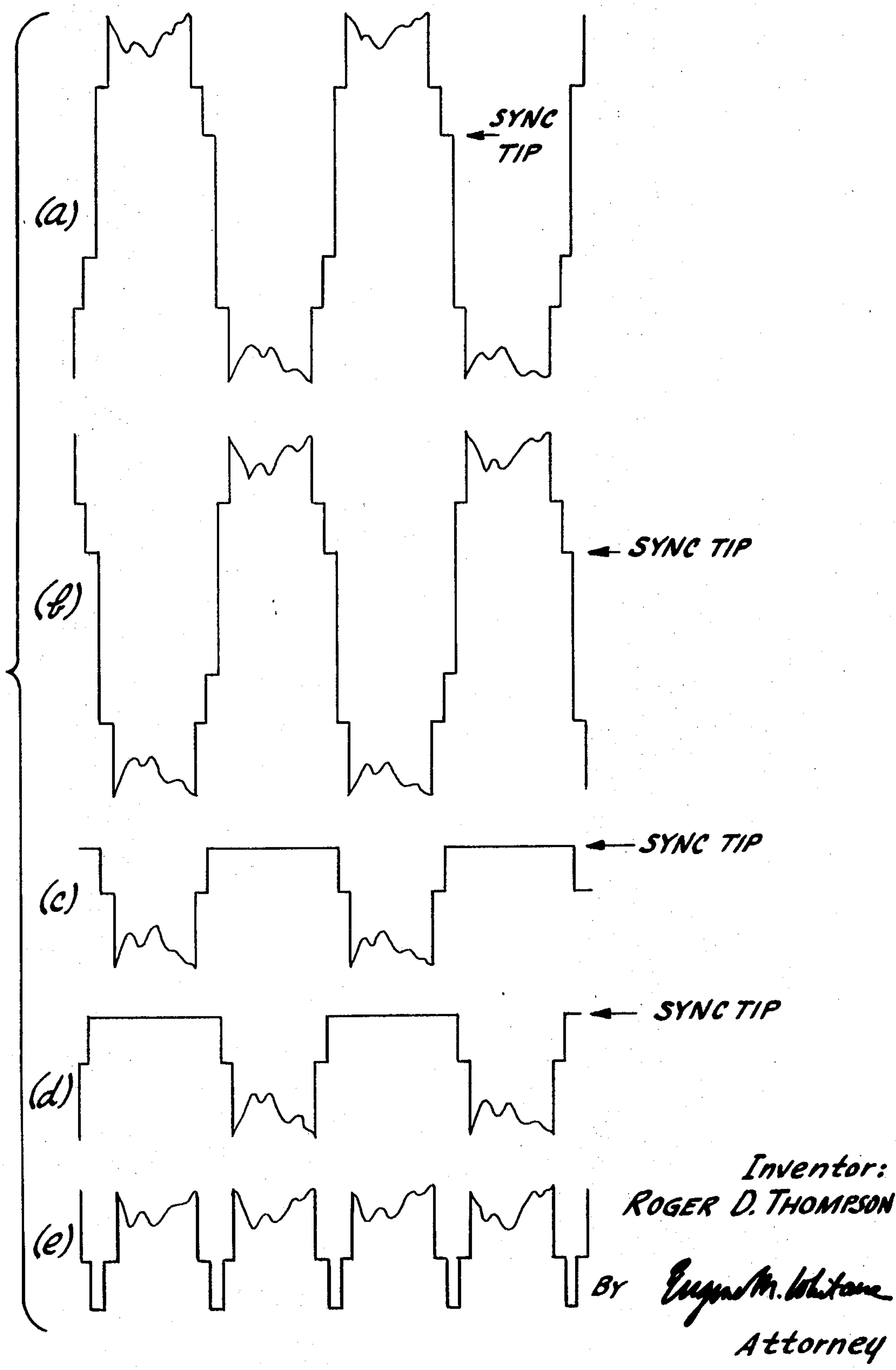
* and FIG. 5 is a graphical representation of a series of waveforms useful in describing the operation of the reproducing portion of the system shown in FIG. 1*b.*

The operation of the reproducing system just described can best be understood by referring to FIG. 5 wherein the signals appearing at the output of successive stages of the reproducing system are illustrated. FIG. 5*a* represents the playback signal obtained at one of the output terminals (for example 86) of the phase splitter 84 and also corresponds to the signal to be recorded as shown in FIG. 3*f*. FIG. 5*b* represents the signal appearing at the other output terminal 88 of the phase splitter 84.

In conformance with the operation of a phase splitter, the signals at terminal 86 and 88 are shown as being equal and of opposite polarity. FIGS. 5*c* and 5*d* represent the signals appearing at the respective output terminals 94 and 100 of amplifiers 92 and 98. Since the amplifiers are both biased to cut off at horizontal sync tip, only portions of the applied signals above the sync tip will be amplified and inverted. Thus, the output of amplifier 92 (FIG. 5*c*) represents portions of the reproduced video signal corresponding to alternate scanning intervals, and the output of amplifier 98 (FIG. 5*d*) represents portions of the reproduced video signal which are interspaced between the alternate scanning interval output of amplifier 92. The outputs from the two amplifiers 92 and 98 can then be added and inverted to produce the original video signal (FIG. 5*e*).

Referring now to FIG. 1*c*, there is shown a reproducing system embodying the invention and suitable for reproducing the recorded information illustrated by the waveform shown in FIG. 3*h*. The recorded information is converted into an electrical signal with alternate polarity portions corresponding to successive scanning intervals by means of a transducer 80 which is coupled to a video playback amplifier 110. The output of the amplifier 110 is applied to the input terminals of a phase splitter 112. The phase splitter 112 provides a pair of output signals at terminal 114 and 116 respectively which correspond to the applied input signals, with one of the output signals being equal in magnitude but opposite in polarity to the other output signal.

The output signal from terminal 114 of the phase splitter 112 is simultaneously applied to a horizontal sync separator 118 and the input terminal of a gated switch 120. Correspondingly the output signal from terminal 116 of phase splitter 112 is simultaneously applied to a horizontal sync separator 122 and the input terminal of a gated switch 124. The output from the horizontal sync separator 118 comprises a series of pulses corresponding to alternately selected ones of the horizontal synchronizing components contained in the electrical signal. The output from the sync separator 122 comprises a series of pulses corresponding to the nonselected synchronizing components of the electrical signal, with the combined outputs from sync separators 120 and 124 being representative of the total synchronizing components contained in the electrical signal.

Gate switches 120 and 124 are designed to pass or gate alternately selected portions of the applied electrical signal corresponding to successive scanning intervals to the respective switch output terminals 126 and 128 for further processing, as will hereinafter be described.

The gating of switches 120 and 124 are respectively controlled by a series of gate pulses developed at and alternating between the output terminals 130 and 132 of a bistable multivibrator 134. The multivibrator 134 is triggered by the output pulses received from the sync separators 118 and 122 to produce gating pulses which alternate between its output terminals 130 and 132. The output from terminal 130 of the multivibrator is coupled to a gating input terminal 136 of switch 120, and the output from multivibrator terminal 132 is coupled to the gate input terminal 138 of switch 124. Application of the gate pulses to the switches 120 and 124 cause portions of the reproduced signal corresponding to alternate scanning intervals to appear sequentially at the respective switch output terminals 126 and 128. The signal at each output terminal substantially comprises one half the applied electrical signal. The signals obtained at the output terminal 126 and 128 of respective switches 120 and 124 are then applied to an adding network 140 wherein the two signals are combined to produce an output signal representative of the original video signal.

By the system described, it will be noted that portions of the video signal corresponding to each scanning interval of a television raster is recorded in alternate polarity. Any dissimilarity encountered in the reproduced signal during alternate scanning intervals tends to be averaged visually after four fields in a television system with two to one interlacing.

Experience has shown that this is a desirable characteristic when dissimilarity is moderate. Severe dissimilarity will tend to cause line crawling. This is a flicker phenomenon and can be corrected by resetting the multivibrator pulse output at a frame rate. Dissimilarity then produces a pattern which is relatively coarse, but experience has shown this to be preferable to a crawling pattern when dissymmetry or unbalance is substantial. A method for resetting the multivibrator at the beginning of each field or frame is disclosed in my U.S. Pat. No. 2,896,016, "Color Image Reproducing Apparatus," assigned to the Radio Corporation of America.

It will be appreciated that in the present invention, a system for magnetically recording a video signal has been shown wherein by inverting the polarity of portions of the signal, and in one embodiment the polarity of the signal being inverted at the rate equal to one half the rate of the recurrent synchronizing components contained in the signal, the low-frequency components contained in the signal are substantially reduced in amplitude so as to thereafter permit preemphasizing of said low-frequency components prior to recording without overloading the head.

I claim:

1. A signal translating system comprising in combination:
means providing a video signal source for developing a video signal;
utilization means;
means coupled between said video signal source and said utilization means for inverting the polarity of portions of said video signal at a rate substantially less that the highest video frequency to be reproduced to substantially reduce the amplitude of the low-frequency components of said video signal; and
means for preemphasizing said low-frequency components coupled between said polarity inverting means and said utilization means.

2. A signal translating system is defined in claim 1 wherein said utilization means comprises a magnetic recording device for recording on a magnetic recording medium the modified video signal with portions inverted in polarity and low-frequency components preemphasized.

3. A signal translating system as defined in claim 2 wherein the portions of said modified video signal inverted in polarity are of opposite polarity with respect to a datum potential than the other portions of said video signal.

4. A signal translating system as defined in claim 3 wherein said video signal includes picture information components and wherein said recording medium has a transfer characteristic including a substantially linear region and wherein the picture information components of said video signal are recorded within the linear region of the transfer characteristic of said recording medium.

5. A signal translating system comprising in combination:
means providing a video signal source for developing a video signal including recurrent synchronizing signal components;
recording means;
means coupled between said video signal source and said recording means for inverting the polarity of portions of said video signal at a rate substantially less than the highest video frequency to be reproduced to substantially reduce the amplitude of the low-frequency components of said video signal; and
means for preemphasizing said low-frequency components coupled between said polarity inverting means and said recording means.

6. A signal translating system as defined in claim 5 wherein the polarity of said video signal is inverted at a rate equal to one half the rate of said recurrent synchronizing signal components.

7. A signal translating system as defined in claim 5 wherein said recording means comprises a magnetic recording device for recording on a magnetic recording medium the modified video signal with portions inverted in polarity and low-frequency components preemphasized.

8. A signal translating system as defined in claim 7 wherein the portions of said modified video signal inverted in polarity are of opposite polarity with respect to a datum potential than the other portions of said video signal.

9. A signal translating system as defined in claim 8 wherein said video signal includes picture information components and wherein said recording medium has a transfer characteristic including a substantially linear region and a relatively nonlinear region and wherein the picture information components of said video signal are recorded within the linear region of the transfer characteristic of said recording medium.

10. A signal translating system as defined in claim 9 wherein the recurrent synchronizing signal components of said video signal are recorded within the nonlinear region of the transfer characteristic of said recording medium.

11. A signal translating system comprising in combination:
means providing a video signal source for developing a video signal;
signal output means;
means modifying said video signal coupled between said video signal source and said signal output means for inverting the polarity of first portions of said video signal with respect to other portions thereof at a rate substantially less than the highest video frequency to be reproduced to substantially reduce the amplitude of the low-frequency components of said video signal;
recording means;
means for preemphasizing said low-frequency components coupled between said polarity inverting means and said recording means; and
means coupled between said signal output means and said recording means for synchronously inverting the polarity of one of said portions of said modified video signal at said rate to derive a signal corresponding to said video signal before modification.

12. In a system for the recording of a video signal on a magnetic medium having a transfer characteristic which includes a nonlinear region, said signal including recurrent synchronizing signal components, the combination of:
input means adapted to receive a video signal having recurrent synchronizing components;
means coupled to said input means for inverting the polarity of portions of said video signal with respect to other portions thereof at a rate equal to one half the rate of said recurrent synchronizing signal components to substantially reduce the amplitude of the low-frequency components of said video signal, and wherein the portions of said video signal inverted in polarity and said other portions of said video signal are of different polarity with respect to a datum potential, said polarity inverting means also including means for adjusting the level of the recurrent synchronizing components of said video signal;
means coupled to the output of said inverting means for preemphasizing the low-frequency components of said video signal; and
means for recording the output signal from said preemphasizing means on said recording medium wherein the recurrent synchronizing components of said video signal are recorded within the nonlinear region of the transfer characteristic of said magnetic medium.

13. In a system for the recording of a video signal representing successive scanning intervals on a recording medium having a transfer characteristic which includes a linear region, said signal having picture information components and recurrent sync pulse components, the combination of:
means for sampling the video signal to provide a pair of output signals corresponding respectively to different portions of said video signal and representative of alternate scanning intervals and in which the tips of said sync pulse portions are set to a prescribed level;
means for inverting one of said output signals;
means for adding said inverted output signal to said other one of said output signals to produce a single composite signal having a reduced magnitude of low-frequency components;

means for processing said signal including preemphasizing said low-frequency components of said single composite signal for recording on said recording medium; and the picture information components of said signal substantially recorded within the linear region of the transfer characteristic of said recording medium.

14. A recording system for an electrical signal representing successive scanning intervals comprising in combination:

means for separating said electrical signal into two signals, one of said two signals corresponding to those portions of said electrical signal which represent alternate scanning intervals, and the other of said two signals corresponding to those portions of said electrical signal which represent scanning intervals other than that of said one signal;

means for combining said two signals to produce a third signal corresponding to said electrical signal but having portions representing alternate scanning intervals of opposite polarity with respect to a datum potential and a reduced magnitude of low-frequency components;

means for precessing said third signal including preemphasizing said low-frequency components of said third signal; and means for recording said processed third signal on a recording medium.

15. A recording system comprising in combination:

input means adapted to receive a video signal representing successive scanning intervals, said video signal having picture information components and recurrent horizontal sync pulse components;

means coupled to said input means for providing gating signals coincident with said recurrent horizontal sync pulse components;

first and second switching means, each respectively responsive to gating signals from said last mentioned means for providing a pair of output signals, one of said output signals corresponding to those portions of said video signal representative of alternate scanning intervals and the other of said output signals corresponding to those portions of said video signal representative of scanning intervals other than that of said one output signal;

means coupled with said first and second switching means for adjusting the level of the horizontal sync pulse components of said video signal;

means for reversing the polarity of the output signal from said first switching means;

means coupled to said reversing means and said second switching means for adding said output signals obtained therefrom to provide a single signal corresponding to said video signal and in which the polarity of portions of the signal representative of alternate scanning intervals has been reversed and said signal portions are of different polarity with respect to a datum potential and in which the amplitude of the low-frequency components are substantially reduced;

means for processing said single signal including preemphasizing said low-frequency components of said single signal; and means for recording said processed single signal on a recording medium having a transfer characteristic which includes a linear region wherein the picture information components of said single signal substantially fill the linear region of the transfer characteristic of said recording medium.

16. A recording system for a video signal representing successive scanning intervals, wherein said signal includes recurrent horizontal picture information components and sync pulse components, said system comprising:

means responsive to said horizontal sync components for generating gating signals;

first and second switching means, each respectively responsive to gating signals from said last-mentioned means for providing a pair of output signals, one of said output signals corresponding to those portions of said video signal representative of alternate scanning intervals and the other of said output signals corresponding to those portions of said video signal representative of scanning intervals other than that of said first output signal;

means coupled to the output of said first switching means for providing a polarity inversion of its output signal;

means for clamping the tips of said sync pulse components of the output signals from said second switching means and said polarity inversion means to a common potential and then combining said signals to provide a single output signal corresponding to said video signal and in which the polarity of portions of the single output signal representative of alternate scanning intervals has been reversed and in which the amplitude of the low-frequency components are substantially reduced;

means for processing said single output signal including preemphasizing said low-frequency components of said single output signal; and means for recording said processed single output signal on a recording medium having a transfer characteristic which includes a linear region, and wherein the level of the horizontal sync pulse components of said single signal is such that said picture information components substantially fill the linear region of the transfer characteristic of said recording medium.

17. A process for recording, comprising the steps of:

receiving a video signal to be recorded;

inverting the polarity of portions of said video signal at a rate substantially less than the highest video frequency to be reproduced to substantially reduce the amplitude of the low-frequency components of said video preemphasizing said low-frequency components of said video signal with portions inverted in polarity; and recording on a magnetic recording medium the modified video signal with portions inverted in polarity and low-frequency components preemphasized.

18. A process for recording as defined in claim 17 wherein said video signal includes picture information components and wherein said recording medium has a transfer characteristic including a substantially linear region and wherein the picture information components of said video signal are recorded within the linear region of the transfer characteristic of said recording medium.

19. A process for recording an electrical signal representing successive scanning intervals comprising the steps of:

receiving an electrical signal representing successive scanning intervals;

separating said electrical signal into two signals, one of said two signals corresponding to those portions of said electrical signal which represent alternate scanning intervals, and the other of said two signals corresponding to those portions of said electrical signal which represent scanning intervals other than that of said one signal;

combining said two signals to produce a third signal corresponding to said electrical signal but having portions representing alternate scanning intervals of opposite polarity with respect to a datum potential and a reduced magnitude of low-frequency components;

processing said third signal including preemphasizing said low-frequency components of said third signal; and recording said processed third signal on a recording medium.

UNITED STATES PATENT OFFICE
CERTIFICATE OF CORRECTION

Patent No. 3,610,819 Dated October 5, 1971

Inventor(s) Roger D. Thompson

It is certified that error appears in the above-identified patent and that said Letters Patent are hereby corrected as shown below:

In Column 7, line 37, that portion reading "is defined" should read -- as defined --. Column 9, line 20, delete "precessing" and substitute -- processing --. Column 10, lines 36 and 37, that portion reading "of said video preemphasizing said" should read -- of said video signal;
preemphasizing said --.

Signed and sealed this 11th day of April 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334